United States Patent
Kidokoro et al.

(10) Patent No.: US 10,221,746 B2
(45) Date of Patent: Mar. 5, 2019

(54) FAILURE DIAGNOSIS APPARATUS FOR EXHAUST GAS CONTROL APPARATUS

(71) Applicant: TOYOTA JIDOSHA KABUSHIKI KAISHA, Toyota-shi, Aichi-ken (JP)

(72) Inventors: Toru Kidokoro, Hadano (JP); Arifumi Matsumoto, Gotemba (JP); Kazuya Takaoka, Susono (JP); Hirokazu Nishijima, Susono (JP); Taiga Hagimoto, Shizuoka-ken (JP); Yuki Terui, Kariya (JP); Akifumi Uozumi, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 308 days.

(21) Appl. No.: 14/651,739

(22) PCT Filed: Dec. 12, 2013

(86) PCT No.: PCT/JP2013/083365
§ 371 (c)(1),
(2) Date: Jun. 12, 2015

(87) PCT Pub. No.: WO2014/092159
PCT Pub. Date: Jun. 19, 2014

(65) Prior Publication Data
US 2015/0308322 A1  Oct. 29, 2015

(30) Foreign Application Priority Data

Dec. 13, 2012 (JP) ................................ 2012-272648

(51) Int. Cl.
*G06F 11/30* (2006.01)
*G21C 17/00* (2006.01)
(Continued)

(52) U.S. Cl.
CPC ............ *F01N 11/007* (2013.01); *F01N 3/035* (2013.01); *F01N 3/2066* (2013.01); *F01N 11/00* (2013.01);
(Continued)

(58) Field of Classification Search
CPC ...... F01N 11/007; F01N 3/035; F01N 3/2066; F01N 11/00; G05B 23/02
(Continued)

(56) References Cited

U.S. PATENT DOCUMENTS 5,349,935 A      9/1994  Uchinami
2004/0244361 A1* 12/2004 Tanabe ................. F01N 3/0842
                                                                60/274

(Continued)

FOREIGN PATENT DOCUMENTS

CN      101578436 B    2/2012
DE      102 26 975 A1  1/2004
(Continued)

*Primary Examiner* — Michael P Nghiem
(74) *Attorney, Agent, or Firm* — Finnegan, Henderson, Farabow, Garrett & Dunner, LLP

(57) ABSTRACT

The invention provides a technique for more accurately executing failure diagnosis for an exhaust gas control apparatus having both a selective reduction function and a filter function. To this end, a failure diagnosis apparatus according to the invention for the exhaust gas control apparatus having both the selective reduction function and the filter function computes a $NO_x$ purification rate pertaining to a case where the exhaust gas control apparatus is normal based on an estimated value of the amount of particulate matter (PM) collected or accumulated in the exhaust gas control apparatus and an estimated value of the $NO_2$ ratio of exhaust gas flowing into the exhaust gas control apparatus, and determines that the exhaust gas control apparatus fails when the (Continued)

difference between the result of the calculation and an actual $NO_x$ purification rate exceeds a threshold.

4 Claims, 8 Drawing Sheets

(51) Int. Cl.
 *F01N 11/00* (2006.01)
 *G05B 23/02* (2006.01)
 *F01N 3/035* (2006.01)
 *F01N 3/20* (2006.01)
 *F01N 3/023* (2006.01)

(52) U.S. Cl.
 CPC ............ *G05B 23/02* (2013.01); *F01N 3/0231* (2013.01); *F01N 2550/02* (2013.01); *F01N 2550/04* (2013.01); *F01N 2560/026* (2013.01); *F01N 2900/1606* (2013.01); *F01N 2900/1621* (2013.01); *Y02T 10/24* (2013.01); *Y02T 10/47* (2013.01)

(58) Field of Classification Search
 USPC .......................................................... 702/183
 See application file for complete search history.

(56) References Cited

U.S. PATENT DOCUMENTS

| | | | |
|---|---|---|---|
| 2006/0021334 A1 | 2/2006 | Kuboshima et al. | |
| 2009/0301059 A1* | 12/2009 | Toshioka | B01D 53/90 60/277 |
| 2010/0024394 A1 | 2/2010 | Kitazawa | |
| 2011/0154808 A1 | 6/2011 | Hirata et al. | |
| 2011/0239628 A1 | 10/2011 | Tanioka | |
| 2011/0265461 A1* | 11/2011 | Shibata | F01N 3/208 60/287 |
| 2013/0098146 A1* | 4/2013 | Shibata | F01N 11/002 73/114.75 |
| 2014/0069097 A1* | 3/2014 | Yasui | F02D 41/0235 60/615 |

FOREIGN PATENT DOCUMENTS

| | | |
|---|---|---|
| JP | H07293351 A | 11/1995 |
| JP | 2881075 B2 | 4/1999 |
| JP | 2006-63970 | 3/2006 |
| JP | 2006-346605 | 12/2006 |
| JP | 2007-315275 A | 12/2007 |
| JP | 2010-65554 | 3/2010 |
| JP | 2010-270614 | 12/2010 |
| JP | 2011-220126 A | 11/2011 |

* cited by examiner

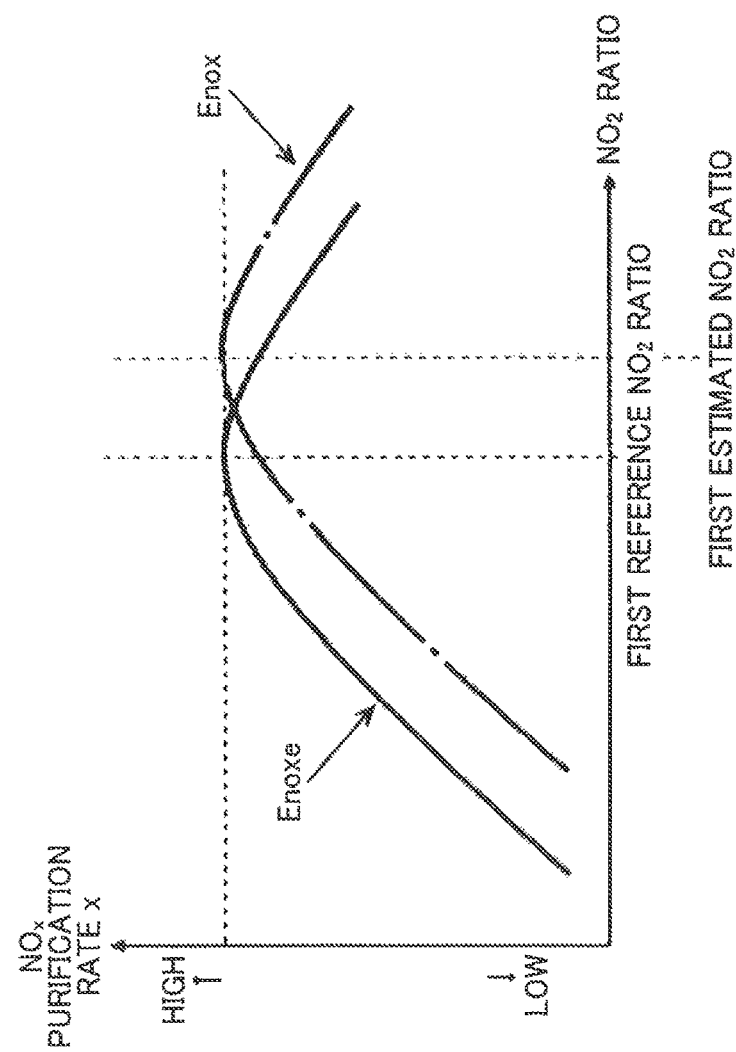

FAILURE DIAGNOSIS APPARATUS FOR EXHAUST GAS CONTROL APPARATUS

CROSS-REFERENCE TO RELATED APPLICATIONS

This application is a national phase application of International Application No. PCT/JP2013/083365, filed Dec. 12, 2013, and claims the priority of Japanese Application No. 2012-272648, filed Dec. 13, 2012, the content of both of which is incorporated herein by reference.

TECHNICAL FIELD

The invention relates to a technique for diagnosing a failure of an exhaust gas control apparatus and, more particularly, to a technique for diagnosing deterioration of an exhaust gas control apparatus having a selective reduction function and a filter function.

BACKGROUND ART

In the related art, a technique for determining a failure of a selective reduction-type catalyst and a failure of a reducing agent supply device based on an average value and a variation of a $NO_x$ purification rate available when the ratio of nitrogen dioxide ($NO_2$) that is contained in $NO_x$ flowing into the selective reduction-type catalyst (hereinafter, referred to as a "$NO_2$ ratio") is within a predetermined range and a reducing agent is supplied to the selective reduction-type catalyst has been proposed as a technique for detecting deterioration of the selective reduction-type catalyst (for example, refer to PTL 1).

PTL 2 discloses a configuration in which a membrane containing a selective reduction-type catalyst is formed on a wall surface of a particulate filter that defines an exhaust gas stream and a membrane where pores, which have a size allowing the passage of $NO_x$ and preventing the passage of particulate matter (PM), are formed is disposed on a surface of the membrane. This configuration has the purpose of suppressing the thermal deterioration of an SCR catalyst when the PM collected in the particulate filter is oxidized.

PTL 3 discloses a configuration in which a supplemental agent that supplements a sulfur compound in exhaust gas is disposed in an outer layer of a base material and a selective reduction-type catalyst is disposed in a back layer of the base material in a wall flow-type particulate filter.

In PTL 4, a reaction between PM collected in a particulate filter and in exhaust gas is described.

CITATION LIST

Patent Literature

PTL 1: Japanese Patent Application Publication No. 2010-270614
PTL 2: Japanese Patent Application Publication No. 2010-065554
PTL 3: Japanese Patent Application Publication No. 2006-346605
PTL 4: Japanese Patent Application Publication No. 2006-063970

SUMMARY OF THE INVENTION

Technical Problem

When a failure of a selective reduction function is to be diagnosed in an exhaust gas control apparatus having both the selective reduction function and a filter function as in a case where a selective reduction-type catalyst is supported by a particulate filter, particulate matter (PM) collected or accumulated in the exhaust gas control apparatus may affect the diagnosis and it may be impossible to perform the diagnosis with accuracy.

When the PM is collected or accumulated in the exhaust gas control apparatus, for example, part of $NO_2$ in exhaust gas may be consumed in a PM oxidation reaction. In this case, the $NO_2$ ratio in the exhaust gas decreases, and thus the amount of $NO_x$ that is purified by the selective reduction-type catalyst may decrease. In addition, at least a part of the selective reduction-type catalyst may be covered with the PM when the PM is collected or accumulated in the exhaust gas control apparatus. In this case, the amount of the $NO_x$ that is purified by the selective reduction-type catalyst may decrease.

In other words, when the PM is collected or accumulated in the exhaust gas control apparatus, the $NO_x$ purification rate of the selective reduction-type catalyst (ratio of the amount of the $NO_x$ flowing into the selective reduction-type catalyst to the amount of the $NO_x$ reduced (purified) in the selective reduction-type catalyst) may decrease even if the selective reduction-type catalyst is normal. As a result, the selective reduction-type catalyst may be erroneously diagnosed as failing even when the selective reduction-type catalyst is normal.

The invention has been made in view of the various circumstances described above, and the purpose of the invention is to provide a technique for more accurately executing failure diagnosis for an exhaust gas control apparatus having both a selective reduction function and a filter function.

Solution to Problem

In order to solve the problems described above, a failure diagnosis apparatus according to the invention for an exhaust gas control apparatus having both a selective reduction function and a filter function computes a $NO_x$ purification rate of the exhaust gas control apparatus based on an estimated value of particulate matter (PM) collected or accumulated in the exhaust gas control apparatus, and determines that the exhaust gas control apparatus fails when the difference between the result of the calculation and an actual $NO_x$ purification rate exceeds a threshold.

Specifically, the failure diagnosis apparatus according to the invention for an exhaust gas control apparatus having both a selective reduction function and a filter function includes first estimating means for estimating a PM accumulation amount as the amount of particulate matter accumulated in the exhaust gas control apparatus, second estimating means for estimating a $NO_2$ ratio showing the ratio of nitrogen dioxide in $NO_x$ flowing into the exhaust gas control apparatus, first computing means for computing a reference $NO_x$ purification rate as a $NO_x$ purification rate pertaining to a case where the exhaust gas control apparatus is normal by using, as parameters, an estimated PM accumulation amount as the PM accumulation amount estimated by the first estimating means and an estimated $NO_2$ ratio as the $NO_2$ ratio estimated by the second estimating means, detecting means for detecting the amount of $NO_x$ contained in exhaust gas, the detecting means being arranged on a downstream side from the exhaust gas control apparatus, second computing means for computing an actual $NO_x$ purification rate as a real $NO_x$ purification rate of the exhaust gas control apparatus by using the amount of the $NO_x$ detected by the detecting means as a parameter, and diagnostic means for determining that the exhaust gas control apparatus fails on condition of the difference between the reference $NO_x$ purification rate and the actual $NO_x$ purification rate exceeding a threshold.

The "selective reduction function" described herein is a function for reducing the $NO_x$ in the exhaust gas in the presence of a reducing agent. The selective reduction function is realized by being provided with a selective reduction-type catalyst and a precious metal catalyst (platinum (Pt), palladium (Pd), and the like). The "filter function" described herein is a function for collecting the PM contained in the exhaust gas.

According to the failure diagnosis apparatus of the invention for an exhaust gas control apparatus, the estimated PM accumulation amount and the estimated $NO_2$ ratio are used as the parameters, and thus the amount of the $NO_2$ that is consumed by the reaction with the PM accumulated in the exhaust gas control apparatus, that is, an $NO_2$ ratio decrement, can be specified. Accordingly, a decrement in the $NO_x$ purification rate that is attributable to the decrease in the $NO_2$ ratio can be specified. Likewise, the amounts of the selective reduction-type catalyst and the precious metal catalyst covered with the PM can be specified from the estimated PM accumulation amount. Accordingly, a decrement in the $NO_x$ purification rate that is attributable to the PM partially covering the selective reduction-type catalyst and the precious metal catalyst can be specified.

The $NO_2$ ratio available when the $NO_x$ purification rate shows a peak value (maximum value) tends to be higher when the amount of the $NO_2$ reacting with the PM in the exhaust gas control apparatus is large than when the amount of the $NO_2$ reacting with the PM in the exhaust gas control apparatus is small. In addition, the peak value of the $NO_x$ purification rate tends to be small when the areas (amounts) of the selective reduction-type catalyst and the precious metal catalyst covered with the PM in the exhaust gas control apparatus are large than when the areas (amounts) of the selective reduction-type catalyst and the precious metal catalyst covered with the PM in the exhaust gas control apparatus are small. When a relationship among the $NO_x$ purification rate, the $NO_2$ ratio, and the PM accumulation amount is obtained in advance based on these tendencies, the $NO_x$ purification rate (reference $NO_x$ purification rate) pertaining to a case where the exhaust gas control apparatus is normal (the selective reduction function of the exhaust gas control apparatus is normal) can be estimated (computed). Accordingly, it can be determined whether or not the exhaust gas control apparatus is normal by comparing the reference $NO_x$ purification rate and the actual $NO_x$ purification rate to each other.

The difference between the reference $NO_x$ purification rate and the actual $NO_x$ purification rate increases not only in a case where the exhaust gas control apparatus deteriorates or fails but also in a case where an estimation error in the estimated PM accumulation amount and/or an estimation error in the estimated $NO_2$ ratio increases. Accordingly, the estimation error in the estimated PM accumulation amount and the estimation error in the estimated $NO_2$ ratio need to be calibrated for the failure diagnosis for the exhaust gas control apparatus to be executed with accuracy.

The failure diagnosis apparatus for an exhaust gas control apparatus according to the invention may further include control means for obtaining a first estimated $NO_2$ ratio as the estimated $NO_2$ ratio available when the actual $NO_x$ purification rate shows a peak and a first reference $NO_2$ ratio as the $NO_2$ ratio available when the $NO_x$ purification rate pertaining to a case where the PM accumulation amount in the exhaust gas control apparatus is equal to the PM accumulation amount available when the first estimated $NO_2$ ratio is obtained and the exhaust gas control apparatus is normal shows a peak, and executing PM regeneration processing for oxidizing and removing the particulate matter accumulated in the exhaust gas control apparatus when the difference between the first estimated $NO_2$ ratio and the first reference $NO_2$ ratio exceeds a tolerance, and correction means for obtaining a second estimated $NO_2$ ratio as the estimated $NO_2$ ratio available when the actual $NO_x$ purification rate shows a peak and a second reference $NO_2$ ratio as the $NO_2$ ratio available when the $NO_x$ purification rate pertaining to a case where the PM accumulation amount in the exhaust gas control apparatus is zero and the exhaust gas control apparatus is normal shows a peak after the execution of the PM regeneration processing, and correcting the estimated $NO_2$ ratio estimated by the second estimating means by using the difference between the second estimated $NO_2$ ratio and the second reference $NO_2$ ratio when the difference between the second estimated $NO_2$ ratio and the second reference $NO_2$ ratio exceeds a tolerance.

When the PM is accumulated in the exhaust gas control apparatus, two factors can be considered as the factors causing the difference between the first estimated $NO_2$ ratio and the first reference $NO_2$ ratio to exceed the tolerance, one being the estimation error (computation error) in the $NO_2$ ratio and the other being the estimation error (computation error or measurement error) in the PM accumulation amount. In a case where the estimated PM accumulation amount includes an error, for example, the estimated PM accumulation amount that is available when the first estimated $NO_2$ ratio is obtained is different in value from the actual PM accumulation amount. Accordingly, the first reference $NO_2$ ratio that is obtained by using the estimated PM accumulation amount as the parameter has a value that is different from the true value. In a case where the estimated $NO_2$ ratio includes an error, the first estimated $NO_2$ ratio is different in value from the actual $NO_2$ ratio. Accordingly, the difference between the first estimated $NO_2$ ratio and the first reference $NO_2$ ratio exceeds the tolerance, for example, even if the exhaust gas control apparatus is normal, in a case where at least one of the estimated PM accumulation amount and the estimated $NO_2$ ratio includes an error.

The actual PM accumulation amount becomes substantially zero after the execution of the PM regeneration processing. Accordingly, the second reference $NO_2$ ratio becomes substantially equal to the true value when the second reference $NO_2$ ratio is obtained with the estimated PM accumulation amount considered to be zero. Accordingly, the second estimated $NO_2$ ratio can be considered to be different from the true value when the difference between the second estimated $NO_2$ ratio and the second reference $NO_2$ ratio exceeds the tolerance. In other words, it can be considered that the estimated $NO_2$ ratio includes an error. The estimation error in the estimated $NO_2$ ratio can be calibrated when the estimated $NO_2$ ratio estimated by the second estimating means is corrected based on the difference between the second estimated $NO_2$ ratio and the second reference $NO_2$ ratio.

In a case where the difference between the second estimated $NO_2$ ratio and the second reference $NO_2$ ratio does not exceed the tolerance, the second estimated $NO_2$ ratio can be considered to be substantially equal to the true value.

Accordingly, the difference between the first estimated $NO_2$ ratio and the first reference $NO_2$ ratio can be considered to be attributed to the estimation error in the estimated PM accumulation amount. Accordingly, the estimation error in the estimated PM accumulation amount can be calibrated when the estimated PM accumulation amount estimated by the first estimating means is corrected based on the difference between the first estimated $NO_2$ ratio and the first reference $NO_2$ ratio.

In a case where the exhaust gas control apparatus is normal and no PM is accumulated in the exhaust gas control apparatus, the $NO_x$ purification rate reaches a peak when the $NO_2$ ratio reaches a specified value (for example, 50%). Accordingly, the specified value described above may be used instead of the second reference $NO_2$ ratio after the execution of the PM regeneration processing.

In a case where the selective reduction function of the exhaust gas control apparatus is normal, the estimated PM accumulation amount can be considered to be substantially equal to the actual PM accumulation amount insofar as the difference between the peak value of the reference $NO_x$ purification rate and the peak value of the actual $NO_x$ purification rate prior to the PM regeneration processing execution does not exceed a tolerance. The correction means may correct the estimated $NO_2$ ratio estimated by the second estimating means by using the difference between the first estimated $NO_2$ ratio and the first reference $NO_2$ ratio insofar as the difference between the peak value of the reference $NO_x$ purification rate and the peak value of the actual $NO_x$ purification rate does not exceed the tolerance in a case where the difference between the first estimated $NO_2$ ratio and the first reference $NO_2$ ratio exceeds the tolerance. According to this method, the estimation error in the estimated $NO_2$ ratio can be calibrated without executing the PM regeneration processing.

Advantageous Effects

According to the invention, the failure diagnosis for the exhaust gas control apparatus having both the selective reduction function and the filter function can be executed with greater accuracy.

BRIEF DESCRIPTION OF THE DRAWINGS

FIG. 4 is a diagram illustrating a $NO_x$ purification rate-$NO_2$ ratio relationship pertaining to a case where an error is included in a calculated value of the $NO_2$ ratio or the PM accumulation amount.

MODES FOR CARRYING OUT THE INVENTION

Hereinafter, specific embodiments of the invention will be described with reference to accompanying drawings. The dimensions, materials, shapes, relative arrangement, and the like of the components described with regard to the embodiments do not limit the technical scope of the invention unless otherwise noted.

First Embodiment

Figure 1:
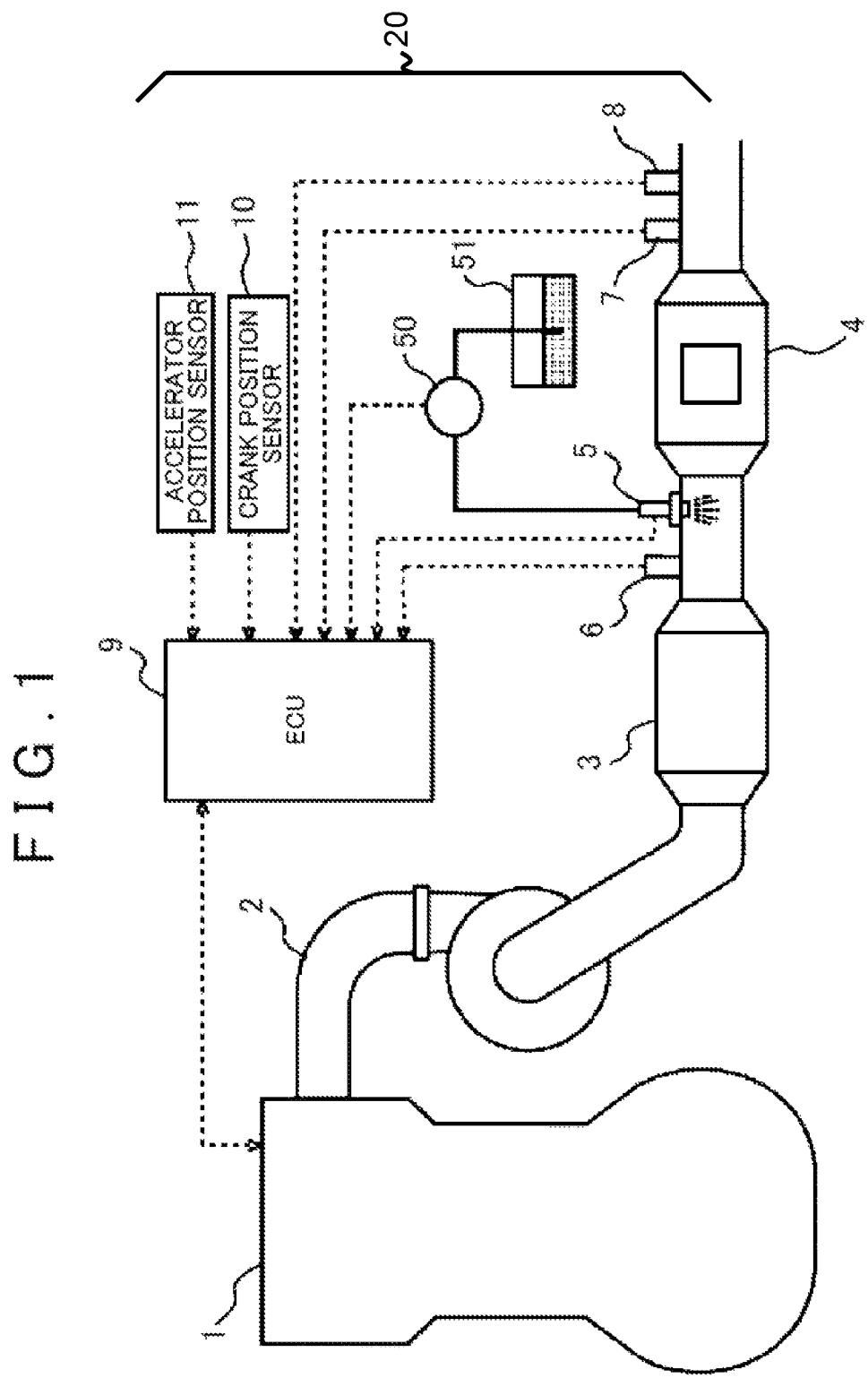
FIG. 1 is a diagram illustrating a schematic configuration of an internal combustion engine to which the invention is applied and an exhaust system of the internal combustion engine.

Firstly, a first embodiment of the invention will be described with reference to FIGS. 1 to 4. FIG. 1 is a diagram illustrating a schematic configuration of an internal combustion engine to which the invention is applied and an exhaust system of the internal combustion engine. The internal combustion engine 1 that is illustrated in FIG. 1 is a compression ignition-type internal combustion engine (diesel engine) or a spark ignition-type internal combustion engine (gasoline engine) that is capable of lean combustion (lean-burn operation).

An exhaust passage 2 is connected to the internal combustion engine 1. The exhaust passage 2 is a passage through which burned gas (exhaust gas) that is discharged out of a cylinder of the internal combustion engine 1 flows. A first catalyst casing 3 and a second catalyst casing 4 are arranged in series from an upstream side in the middle of the exhaust passage 2.

The first catalyst casing 3 has an oxidation catalyst in a cylindrical casing. The second catalyst casing 4 accommodates an exhaust gas control apparatus 20, which has both a selective reduction function and a filter function, in a cylindrical casing. The exhaust gas control apparatus 20 is, for example, an apparatus in which a wall surface of a passage of a wall flow-type particulate filter is coated with a catalyst carrier (for example, an alumina-based or zeolite-based active component) in which a selective reduction-type catalyst and a precious metal catalyst (platinum (Pt), palladium (Pd), and the like) are supported.

A reducing agent addition valve 5 that adds (injects) a reducing agent which is ammonia or a precursor of ammonia to the exhaust gas is mounted on a section of the exhaust passage 2 between the first catalyst casing 3 and the second catalyst casing 4. The reducing agent addition valve 5 is a valve device that has an injection hole which is opened or closed by a needle movement. The reducing agent addition valve 5 is connected to a reducing agent tank 51 via a pump 50. The pump 50 suctions the reducing agent that is stored in the reducing agent tank 51 and pumps the suctioned reducing agent to the reducing agent addition valve 5. The reducing agent addition valve 5 injects the reducing agent that is pumped from the pump 50 into the exhaust passage 2. The opening and closing timing of the reducing agent addition valve 5 and the discharge pressure of the pump 50 are electrically controlled by an electronic control unit (ECU) 9.

Herein, the reducing agent that is stored in the reducing agent tank 51 is a reducing agent that is a precursor of ammonia. An aqueous solution such as urea and ammonium carbamate can be used as the reducing agent that is the precursor of the ammonia. In this embodiment, a urea aqueous solution is used as the reducing agent.

When the urea aqueous solution is injected from the reducing agent addition valve 5, the area aqueous solution flows into the second catalyst casing 4 with the exhaust gas. In this case, the urea aqueous solution receives the exhaust gas and heat from the exhaust gas control apparatus and is subjected to thermal decomposition or hydrolysis. Ammonia ($NH_3$) is produced when the urea aqueous solution is subjected to the thermal decomposition or the hydrolysis. The ammonia ($NH_3$) that is produced in this manner is adsorbed or occluded in the selective reduction-type catalyst. The ammonia ($NH_3$) that is adsorbed or occluded in the selective reduction-type catalyst reacts with nitrogen oxide ($NO_x$) contained in the exhaust gas and produces nitrogen ($N_2$) and water ($H_2O$). In other words, the ammonia ($NH_3$) functions as the reducing agent for the nitrogen oxide ($NO_x$). If the ammonia ($NH_3$) is adsorbed over a wide range of the selective reduction-type catalyst in this case, the nitrogen oxide ($NO_x$) purification rate of the selective reduction-type catalyst can be increased.

The ECU 9 is also disposed in the internal combustion engine 1 that has the configuration described above. The ECU 9 is an electronic control unit that is provided with a CPU, a ROM, a RAM, a backup RAM, and the like. Various sensors, such as a first $NO_x$ sensor 6, a second $NO_x$ sensor 7, an exhaust gas temperature sensor 8, a crank position sensor 10, and an accelerator position sensor 11, are electrically connected to the ECU 9.

The first $NO_x$ sensor 6 is arranged at a section of the exhaust passage 2 on a downstream side from the first catalyst casing 3 and on an upstream side from the second catalyst casing 4. The first $NO_x$ sensor 6 outputs an electric signal correlated to the amount of nitrogen oxide ($NO_x$) that is contained in the exhaust gas which flows into the second catalyst casing 4 (hereinafter, referred to as "$NO_x$ inflow amount"). The second $NO_x$ sensor 7 is arranged at a section of the exhaust passage 2 on a downstream side from the second catalyst casing 4. The second $NO_x$ sensor 7 outputs an electric signal correlated to the amount of $NO_x$ that flows out from the second catalyst casing 4 (hereinafter, referred to as "$NO_x$ outflow amount"). The exhaust gas temperature sensor 8 is arranged at a section of the exhaust passage 2 on a downstream side from the second catalyst casing 4 and outputs an electric signal correlated to the temperature of the exhaust gas that flows out from the second catalyst casing 4. The crank position sensor 10 outputs an electric signal correlated to a rotational position of an output shaft (crankshaft) of the internal combustion engine 1. The accelerator position sensor 11 outputs an electric signal correlated to an accelerator pedal operation amount (accelerator opening).

Various instruments (for example, a fuel injection valve and the like) that are mounted on the internal combustion engine 1, the reducing agent addition valve 5, the pump 50, and the like are electrically connected to the ECU 9. The ECU 9 electrically controls the various instruments of the internal combustion engine 1, the reducing agent addition valve 5, the pump 50, and the like based on the output signals from the various sensors described above. For example, the ECU 9 performs failure diagnosis processing for the exhaust gas control apparatus that is accommodated in the second catalyst casing 4 in addition to known control such as fuel injection control for the internal combustion engine 1 and addition control for intermittently injecting the reducing agent from the reducing agent addition valve 5.

Hereinafter, the failure diagnosis processing for the exhaust gas control apparatus will be described. The failure diagnosis processing that is described herein is processing for diagnosing a failure (deterioration) of the selective reduction function. The $NO_x$ purification rate of the exhaust gas control apparatus is lower in a case where the selective reduction function fails than in a case where the selective reduction function does not fail. Accordingly, a method by which the selective reduction function is determined to fail on condition of the $NO_x$ purification rate of the exhaust gas control apparatus being exceeded by a threshold can be considered.

In the exhaust gas control apparatus that has both the selective reduction function and the filter function, a situation may occur in which the $NO_x$ purification rate is exceeded by the threshold even if the selective reduction function is normal. For example, part of the $NO_2$ in the exhaust gas may be consumed in a PM oxidation reaction when PM is collected or accumulated in the exhaust gas control apparatus.

In the case of a normal selective reduction function of the exhaust gas control apparatus, the $NO_x$ purification rate of the exhaust gas control apparatus shows a peak when the $NO_2$ ratio ($NO_2/(NO+NO_2)$) of the exhaust gas that flows into the second catalyst casing 4 (exhaust gas control apparatus) is within a predetermined range (for example, approximately 50%). Accordingly, it is preferable that the operation state of the internal combustion engine 1 and the temperature of the oxidation catalyst are controlled so that the $NO_2$ ratio of the exhaust gas that flows into the exhaust gas control apparatus becomes approximately 50%. When the PM is accumulated in the exhaust gas control apparatus, however, part of the $NO_2$ contained in the exhaust gas reacts with the PM, and thus the $NO_2$ ratio is lower than a predetermined range. As a result, the $NO_x$ purification rate of the exhaust gas control apparatus decreases. In addition, at least a part of the selective reduction-type catalyst is covered with the PM when the PM is accumulated in the exhaust gas control apparatus, and thus the amount of the $NO_x$ that is purified by the selective reduction-type catalyst may decrease. Accordingly, the $NO_x$ purification rate of the exhaust gas control apparatus may be exceeded by the threshold, even if the selective reduction function is normal, when the PM is collected or accumulated in the exhaust gas control apparatus.

In contrast, in the failure diagnosis processing according to this embodiment, the failure of the selective reduction function is diagnosed by using the $NO_2$ ratio of the exhaust gas that flows into the second catalyst casing 4 and a PM accumulation amount in the exhaust gas control apparatus as parameters, computing (estimating) the $NO_x$ purification rate (reference $NO_x$ purification rate) pertaining to a case where the exhaust gas control apparatus is normal, and comparing the reference $NO_x$ purification rate to a real $NO_x$ purification rate (actual $NO_x$ purification rate).

Specifically, the ECU 9 computes the amount of the PM that flows into the second catalyst casing 4 (PM inflow amount) by using, as the parameters, the amount of the PM that is discharged from the internal combustion engine 1 and the amount of the PM that is oxidized in a path reaching the second catalyst casing 4 from the internal combustion engine 1. The ECU 9 computes the PM accumulation amount (estimated PM accumulation amount) by integrating the PM inflow amount. The amount of the PM that is discharged from the internal combustion engine 1 can be computed by using the operation state of the internal combustion engine 1 (fuel injection amount, intake air amount, engine speed, or the like) as a parameter. In addition, the amount of the PM that is oxidized in the path reaching the second catalyst casing 4 from the internal combustion engine 1 can be computed by using an exhaust gas temperature and the ambient temperature in the first catalyst casing 3 (bed temperature of the oxidation catalyst) as parameters.

The ECU 9 computes the $NO_2$ ratio (estimated $NO_2$ ratio) of the exhaust gas that flows into the second catalyst casing 4 by using, as parameters, the amounts of the nitric oxide (NO) and the nitrogen dioxide ($NO_2$) discharged from the internal combustion engine 1 and the amount of NO converted into $NO_2$ in the oxidation catalyst. The amounts of the NO and the $NO_2$ discharged from the internal combustion engine 1 can be computed from the operating conditions of the internal combustion engine 1 (fuel injection amount, intake air amount, engine load (accelerator opening), and engine speed). The amount of the NO converted into the $NO_2$ in the oxidation catalyst can be computed from the bed temperature of the oxidation catalyst.

After the estimated PM accumulation amount in the exhaust gas control apparatus and the estimated $NO_2$ ratio of the exhaust gas that flows into the second catalyst casing 4 are calculated by the method described above, the ECU 9 computes the reference $NO_x$ purification rate by using a correlation among the estimated PM accumulation amount, the estimated $NO_2$ ratio, and the $NO_x$ purification rate.

Figure 2:
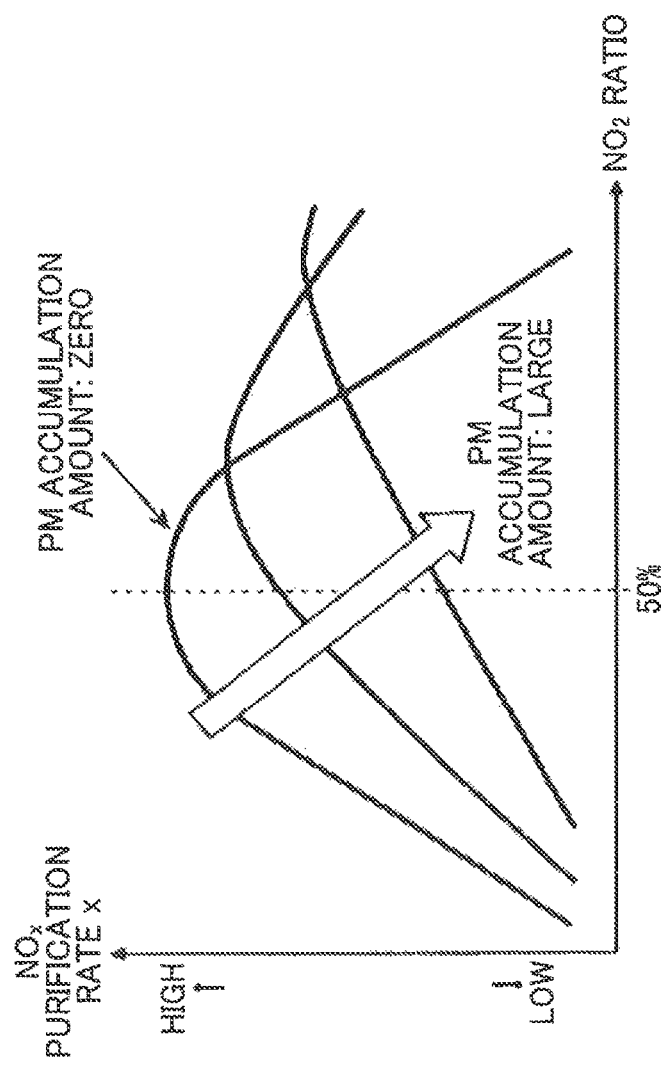
FIG. 2 is a diagram illustrating a correlation among the $NO_2$ ratio of exhaust gas that flows into a second catalyst casing, a PM accumulation amount in an exhaust gas control apparatus, and the $NO_x$ purification rate of the exhaust gas control apparatus.

Herein, FIG. 2 illustrates a correlation among the PM accumulation amount, the $NO_2$ ratio, and the $NO_x$ purification rate pertaining to the case of a normal selective reduction function of the exhaust gas control apparatus. In FIG. 2, the $NO_x$ purification rate reaches a peak while the $NO_2$ ratio is 50% when the PM accumulation amount in the exhaust gas control apparatus is zero (when no PM is accumulated in the particulate filter). In contrast, when the PM is accumulated in the exhaust gas control apparatus, the peak value of the $NO_x$ purification rate decreases and the $NO_2$ ratio that is available when the $NO_x$ purification rate shows the peak value increases (exceeds 50%) as the PM accumulation amount increases. This is because the amount of the $NO_2$ that reacts with the PM increases and the area (amount) of the selective reduction-type catalyst that is covered with the PM increases as the PM accumulation amount increases.

The correlation that is illustrated in FIG. 2 may be stored in advance in the ROM of the ECU 9 as a map or a function having the PM accumulation amount and the $NO_2$ ratio as factors. In this case, the ECU 9 can compute (estimate) the $NO_x$ purification rate (reference $NO_x$ purification rate) pertaining to the case of a normal selective reduction function of the exhaust gas control apparatus by using, as the factors, the estimated PM accumulation amount and the estimated $NO_2$ ratio calculated by the method described above. That is, ECU 9 may be configured to compute the reference $NO_x$ purification rate by using the characteristic that a peak value of the $NO_x$ purification rate decreases and the $NO_2$ ratio corresponding to the maximum value of the NOx purification rate increases as the PM accumulation amount in the exhaust gas control apparatus increases as illustrated in FIG. 2. The $PM$-$NO_2$ reaction tends to become more active as the ambient temperature in the second catalyst casing 4 increases. In other words, the $NO_2$ ratio available when the $NO_x$ purification rate shows a peak tends to increase as the ambient temperature in the second catalyst casing 4 increases. The reference $NO_x$ purification rate may also be calculated by using a map created in advance so as to derive the reference $NO_x$ purification rate by using the PM accumulation amount, the $NO_2$ ratio, and the ambient temperature of the second catalyst casing 4 as factors. In this case, the output signal from the exhaust gas temperature sensor 8 may be used as the ambient temperature of the second catalyst casing 4.

Next, the ECU 9 computes the actual $NO_x$ purification rate (Enox) of the exhaust gas control apparatus in accordance with the following Equation (1).

$$Enox=1-(Anox\text{out}/Anox\text{in}) \quad (1)$$

In the Equation (1), the Anoxin is the output signal ($NO_x$ inflow amount) from the first $NO_x$ sensor 6 and the Anoxout is the output signal ($NO_x$ outflow amount) from the second $NO_x$ sensor 7. The $NO_x$ inflow amount Anoxin may be computed from the operating conditions of the internal combustion engine 1 (fuel injection amount, intake air amount, engine load, and engine speed).

The ECU 9 computes the difference ΔEnox between the actual $NO_x$ purification rate Enox calculated based on the Equation (1) above and the reference $NO_x$ purification rate Enoxe. The ECU 9 determines whether or not the difference ΔEnox is equal to or less than a threshold. If the difference ΔEnox is equal to or less than the threshold, the ECU 9 determines that the selective reduction function of the exhaust gas control apparatus is normal. If the difference ΔEnox exceeds the threshold, the ECU 9 determines that the selective reduction function of the exhaust gas control apparatus fails. The "threshold" herein, which is a value that is obtained by adding a margin to the maximum value taken by the difference ΔEnox when the selective reduction function is normal, is a value that is obtained in advance in an experiment or the like through appropriate processing.

If the failure diagnosis processing for the selective reduction function is executed by this method, it is possible to avoid a situation in which the selective reduction function is erroneously diagnosed as failing even if the selective reduction function is normal in the exhaust gas control apparatus that has both the selective reduction function and the filter function. Accordingly, the failure of the selective reduction function can be more accurately diagnosed in the exhaust gas control apparatus that has both the selective reduction function and the filter function.

Figure 3:
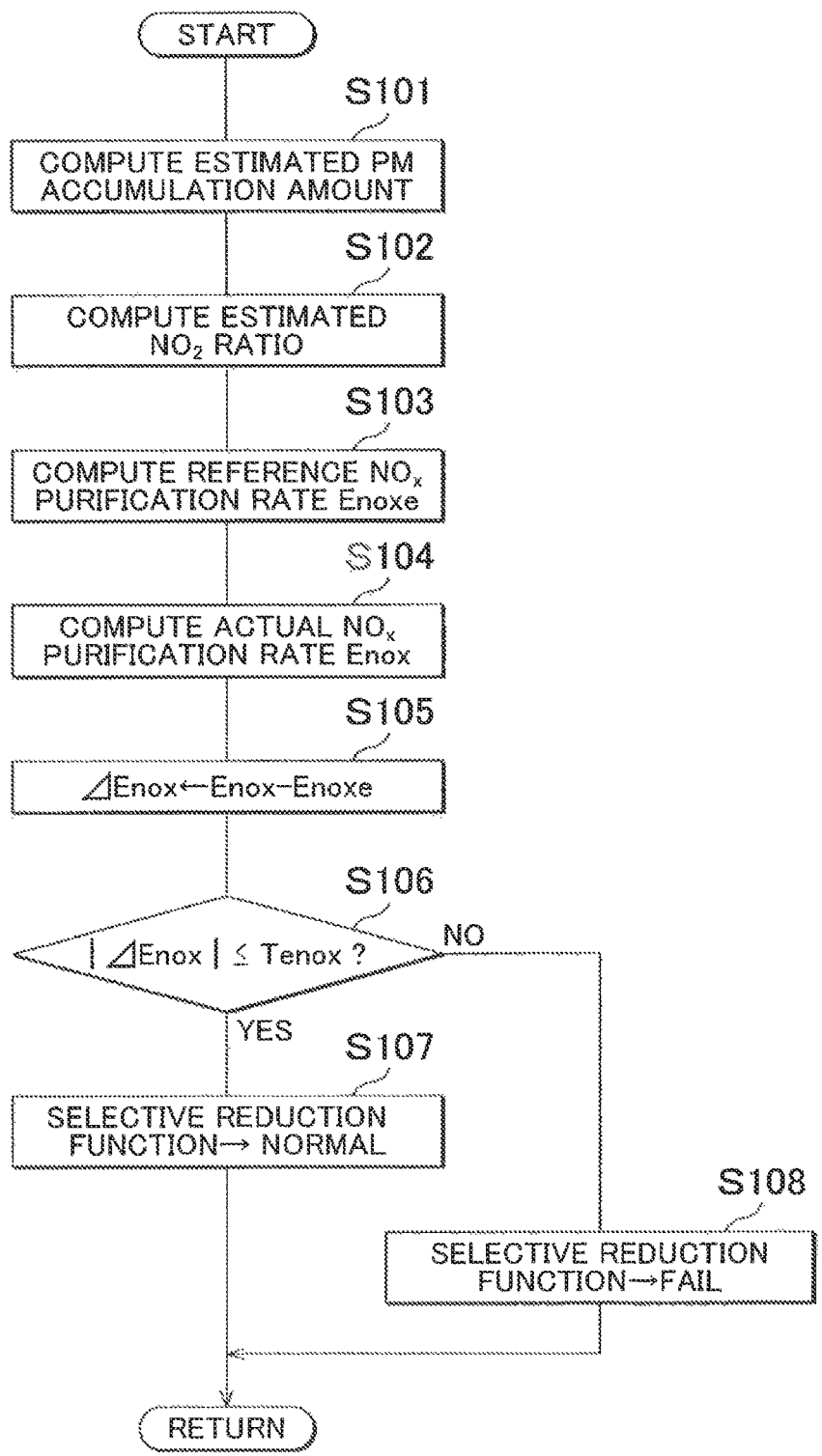
FIG. 3 is a flowchart illustrating a processing routine that is executed by an ECU 9 when a failure diagnosis for a selective reduction function is performed.

Hereinafter, the procedure of the execution of the failure diagnosis processing according to this embodiment will be described with reference to FIG. 3. FIG. 3 is a flowchart illustrating a processing routine that is executed by the ECU 9 when the failure diagnosis for the selective reduction function is performed. The processing routine in FIG. 3 is stored in advance in the ROM of the ECU 9 and is periodically executed by the ECU 9 (CPU).

In the processing routine in FIG. 3, the ECU 9 first computes the estimated PM accumulation amount in the exhaust gas control apparatus in the processing of S101. In this case, the ECU 9 computes the amount of the PM that flows into the second catalyst casing 4 (PM inflow amount) from the amount of the PM that is discharged from the internal combustion engine 1 and the amount of the PM that is oxidized in the path reaching the second catalyst casing 4 from the internal combustion engine 1 as described above and computes the estimated PM accumulation amount by integrating the PM inflow amount. In a case where a differential pressure sensor that detects the difference (before-and-after differential pressure) between the exhaust gas pressure on the upstream side from the second catalyst casing 4 and the exhaust gas pressure on the downstream side from the second catalyst casing 4 is mounted on the exhaust passage 2, the ECU 9 may compute the estimated PM accumulation amount from a value measured by the differential pressure sensor. The first estimating means according to the invention is realized by the ECU 9 executing the processing of S101 in this manner.

In the processing of S102, the ECU 9 computes the estimated $NO_2$ ratio of the exhaust gas that flows into the second catalyst casing 4. In this case, the ECU 9 computes the estimated $NO_2$ ratio of the exhaust gas that flows into the second catalyst casing 4 by using the amounts of the NO and the $NO_2$ discharged from the internal combustion engine 1 and the amount of the NO converted into the $NO_2$ in the oxidation catalyst as the parameters as described above. The second estimating means according to the invention is realized by the ECU 9 executing the processing of S102 in this manner.

In the processing of S103, the ECU 9 computes the reference $NO_x$ purification rate Enoxe based on the estimated PM accumulation amount that is calculated in the processing of S101 and the estimated $NO_2$ ratio that is calculated in the processing of S102. In this case, the ECU 9 calculates the reference $NO_x$ purification rate Enoxe by using the map that is illustrated in FIG. 2 described above. The first computing means according to the invention is realized by the ECU 9 executing the processing of S103 in this manner.

In the processing of S104, the ECU 9 computes the actual $NO_x$ purification rate Enox. In this case, the ECU 9 computes the actual $NO_x$ purification rate Enox by substituting the output signal ($NO_x$ inflow amount) Anoxin from the first $NO_x$ sensor 6 and the output signal ($NO_x$ outflow amount) Anoxout from the second $NO_x$ sensor 7 into the Equation (1) above as described above. The second computing means according to the invention is realized by the ECU 9 executing the processing of S104 in this manner.

In the processing of S105, the ECU 9 computes the difference ΔEnox between the reference $NO_x$ purification rate Enoxe that is calculated in the processing of S103 and the actual $NO_x$ purification rate Enox that is calculated in the processing of S104.

In the processing of S106, the ECU 9 determines whether or not the absolute value of the difference ΔEnox that is calculated in the processing of S105 is equal to or less than a threshold Tenox. The threshold Tenox, which is a value that is obtained by adding a margin to the maximum value taken by the absolute value of the difference ΔEnox in a case where the selective reduction function is normal, is a value that is obtained in advance in an experiment or the like through appropriate processing.

In the case of a positive determination in the processing of S106 (|ΔEnox|≤Tenox), the ECU 9 allows the processing to proceed to S107 and determines that the selective reduction function is normal. In the case of a negative determination in the processing of S106 (|ΔEnox|>Tenox), the ECU 9 allows the processing to proceed to S108 and determines that the selective reduction function fails. The diagnostic means according to the invention is realized by the ECU 9 executing the processing of S106 to S108 in this manner.

According to the embodiment described above, it is possible to avoid a situation in which the selective reduction function is erroneously diagnosed as failing even if the selective reduction function is normal in the exhaust gas control apparatus that has both the selective reduction function and the filter function. As a result, the failure diagnosis for the selective reduction function can be more accurately performed in the exhaust gas control apparatus that has both the selective reduction function and the filter function.

Second Embodiment

Next, a second embodiment of the invention will be described with reference to FIGS. 5 to 7. Herein, the configuration of the second embodiment that is different from that of the first embodiment described above will be described, and the configuration common to the first embodiment and the second embodiment will be omitted.

In this embodiment, a method for calibrating an estimation error in the estimated $NO_2$ ratio or the estimated PM accumulation amount will be described. The absolute value of the difference ΔEnox may exceed the threshold Tenox, even though the selective reduction function is normal, in a case where an error occurs between the estimated $NO_2$ ratio and an actual $NO_2$ ratio and in a case where an error occurs between the estimated PM accumulation amount and an actual PM accumulation amount.

It is desirable that the estimation error (computation error) in the estimated $NO_2$ ratio and/or the estimated PM accumulation amount is calibrated before the execution of the failure diagnosis processing for the selective reduction function. In the following description, a method for calibrating the computation errors in the estimated $NO_2$ ratio and the estimated PM accumulation amount will be described.

The ECU 9 first obtains the estimated $NO_2$ ratio (first estimated $NO_2$ ratio) that is available when the actual $NO_x$ purification rate Enox shows a peak. The actual $NO_x$ purification rate Enox varies depending on the PM accumulation amount. Accordingly, a correlation between the estimated $NO_2$ ratio and the actual $NO_x$ purification rate Enox that is available when the PM accumulation amount is a constant amount needs to be obtained in a case where the first estimated $NO_2$ ratio is obtained.

A contrary method is considered for repeatedly executing the processing for obtaining the estimated $NO_2$ ratio and the actual $NO_x$ purification rate Enox available when the estimated PM accumulation amount becomes equal to a predetermined amount determined in advance. According to this method, a correlation between the estimated $NO_2$ ratio and the actual $NO_x$ purification rate Enox pertaining to a case where the estimated PM accumulation amount is equal to a predetermined amount can be obtained. As a result, the first estimated $NO_2$ ratio can also be obtained. However, the chance of the estimated PM accumulation amount becoming equal to a predetermined amount is limited to only once in a period continuing from the execution of processing for oxidizing or removing the PM collected in the exhaust gas control apparatus (PM regeneration processing) until the execution of the subsequent PM regeneration processing, and thus the length of time taken until the first estimated $NO_2$ ratio is obtained increases.

The ECU 9 may obtain the correlation between the estimated $NO_2$ ratio and the actual $NO_x$ purification rate Enox and may obtain the first estimated $NO_2$ ratio from the correlation by changing the $NO_2$ ratio of the exhaust gas that is discharged from the internal combustion engine 1 when a small amount of the PM is discharged per unit time from the internal combustion engine 1.

Examples of the operation state where a small amount of the PM is discharged per unit time from the internal combustion engine 1 can include a low load-low speed operation area having a small fuel injection amount, preferably, an idle operation area.

When the internal combustion engine 1 is in an idle operation state, the absolute amount of the PM that is discharged per unit time from the internal combustion engine 1 is small. Accordingly, if the $NO_2$ ratio of the exhaust gas that is discharged from the internal combustion engine 1 is changed every few cycles, the first estimated $NO_2$ ratio can be obtained under the condition of a substantially constant PM accumulation amount.

In addition, a method for changing the air-fuel ratio of an air-fuel mixture, a method for changing an exhaust gas recirculation (EGR) gas amount, a method for changing the pressure of supercharging of intake air by a supercharger, or the like can be used as the method for changing the $NO_2$ ratio of the exhaust gas that is discharged from the internal combustion engine 1.

Next, the ECU 9 obtains the $NO_2$ ratio (first reference $NO_2$ ratio) that is available when the $NO_x$ purification rate (reference $NO_x$ purification rate) pertaining to the case of a normal selective reduction function shows a peak by using the estimated PM accumulation amount that is available when the first estimated $NO_2$ ratio is obtained as a parameter. Specifically, the ECU 9 obtains the first reference $NO_2$ ratio based on the estimated PM accumulation amount that is available when the first estimated $NO_2$ ratio is obtained and the map that is illustrated in FIG. 2 described above.

Herein, in the case of a failure of the selective reduction function, failures of the $NO_x$ sensors 6, 7, or the like, the peak value of the reference $NO_x$ purification rate Enoxe and the peak value of the actual $NO_x$ purification rate Enox deviate from each other. However, in a case where an error is included in at least one of the estimated PM accumulation amount and the estimated $NO_2$ ratio, the first estimated $NO_2$ ratio and the first reference $NO_2$ ratio deviate from each other as illustrated in FIG. 4. In a case where the estimated $NO_2$ ratio includes an estimation error, for example, the first estimated $NO_2$ ratio has a value that differs from the true value. In addition, in a case where the estimated PM accumulation amount includes an estimation error, the first reference $NO_2$ ratio has a value that differs from the true value. Accordingly, the first estimated $NO_2$ ratio and the first reference $NO_2$ ratio deviate from each other in a case where an error is included in at least one of the estimated PM accumulation amount and the estimated $NO_2$ ratio.

In a case where the difference $\Delta$Rno2bfr between the first estimated $NO_2$ ratio and the first reference $NO_2$ ratio exceeds a tolerance, it can be considered that an error is included in the value of the estimated $NO_2$ ratio or the estimated PM accumulation amount. The tolerance described above is a value that is obtained in advance in an experiment or the like through appropriate processing.

The ECU 9 executes the PM regeneration processing in a case where the difference $\Delta$Rno2bfr between the first estimated $NO_2$ ratio and the first reference $NO_2$ ratio exceeds the tolerance. The PM regeneration processing is processing for oxidizing and removing the PM that is collected in the exhaust gas control apparatus by raising the ambient temperature in the second catalyst casing 4 to a temperature region allowing the oxidization of the PM. A method for raising the exhaust gas temperature by using the reaction heat that is generated when unburned fuel is oxidized by the oxidation catalyst after the unburned fuel is supplied to the first catalyst casing 3, a method for directly heating the second catalyst casing 4 by using a heater or the like, or the like can be used as the method for raising the ambient temperature in the second catalyst casing 4 to the temperature region allowing the oxidization of the PM. In addition, a method for injecting fuel into a cylinder in an exhaust stroke, a method for adding fuel into the exhaust gas from a fuel addition valve that is arranged in the exhaust passage 2 on an upstream side from the first catalyst casing 3, or the like can be used as the method for supplying unburned fuel to the first catalyst casing 3.

The ECU 9 re-computes the estimated $NO_2$ ratio (second estimated $NO_2$ ratio) that is available when the actual $NO_x$ purification rate Enox shows a peak by changing the $NO_2$ ratio of the exhaust gas discharged from the internal combustion engine 1 after the execution of the PM regeneration processing. In addition, the ECU 9 computes the $NO_2$ ratio (second reference $NO_2$ ratio) that is available when the reference $NO_x$ purification rate pertaining to a case where the PM accumulation amount becomes zero shows a peak. Specifically, the ECU 9 obtains the $NO_2$ ratio that is available when the $NO_x$ purification rate pertaining to a case where the PM accumulation amount becomes zero shows a peak in the map illustrated in FIG. 2 and sets the $NO_2$ ratio as the second reference $NO_2$ ratio.

The ECU 9 compares the second estimated $NO_2$ ratio to the second reference $NO_2$ ratio. The PM accumulation amount becomes substantially zero after the execution of the PM regeneration processing. Accordingly, the second reference $NO_2$ ratio can be considered to be equal to the true value. Accordingly, the estimated $NO_2$ ratio can be considered to include an error if the difference $\Delta$Rno2aft between the second estimated $NO_2$ ratio and the second reference $NO_2$ ratio exceeds a tolerance. In a case where the difference $\Delta$Rno2aft between the second estimated $NO_2$ ratio and the second reference $NO_2$ ratio exceeds the tolerance, the ECU 9 calibrates the error in the estimated $NO_2$ ratio by adding the difference $\Delta$Rno2aft to the estimated $NO_2$ ratio.

When the difference $\Delta$Rno2aft is equal to or less than the tolerance, it can be considered that the factor causing the difference $\Delta$Rno2bfr prior to the execution of the PM regeneration processing to exceed the tolerance lies in the computation error in the PM accumulation amount. Herein, the ECU 9 calibrates the error in the estimated PM accumulation amount by adding the difference $\Delta$Rno2bfr prior to the execution of the PM regeneration processing to the calculated value of the PM accumulation amount.

The diagnostic accuracy can be further improved when the failure diagnosis processing for the selective reduction function is executed by using the estimated $NO_2$ ratio and the estimated PM accumulation amount calibrated by using this method.

Figure 5A:
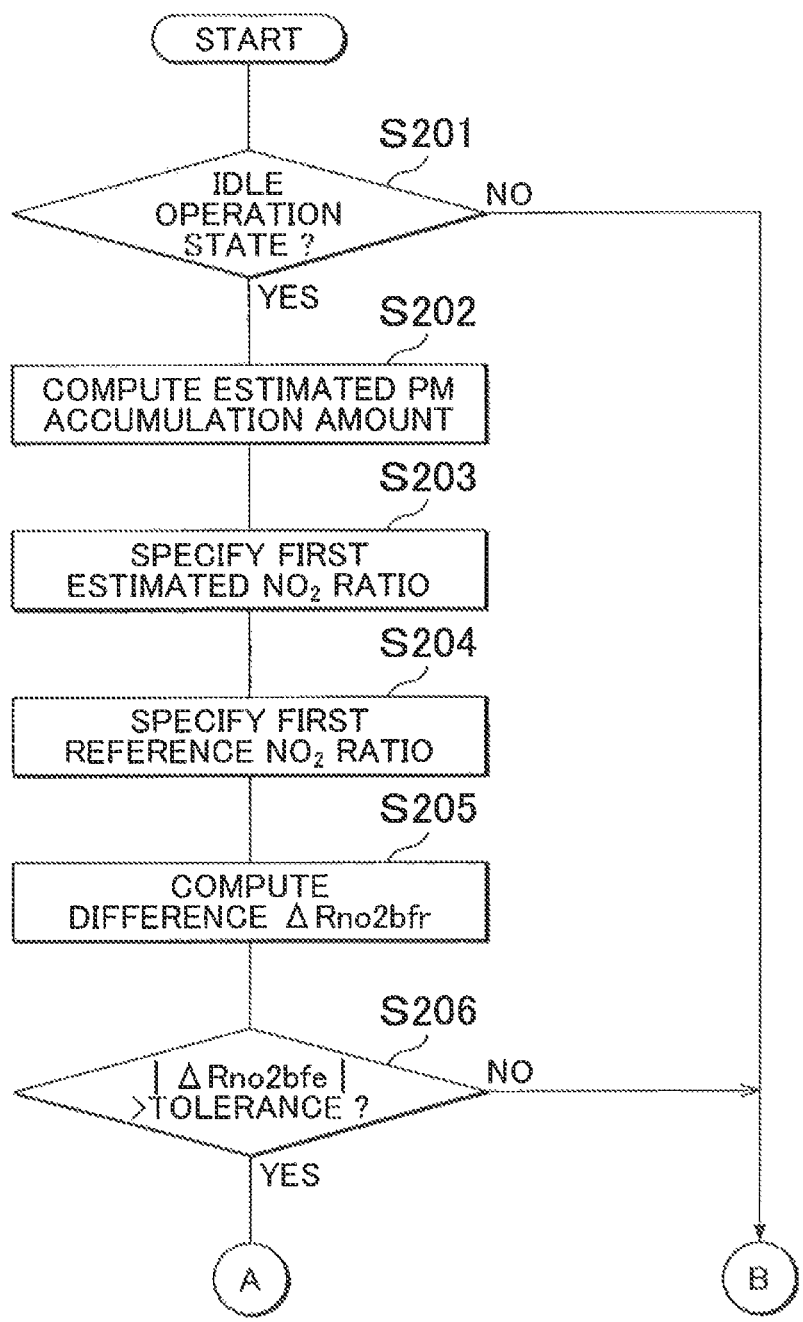
FIG. 5A and FIG. 5B are a flowchart illustrating a processing routine that is executed by the ECU 9 when the $NO_2$ ratio and the PM accumulation amount are calibrated.
Figure 5B:
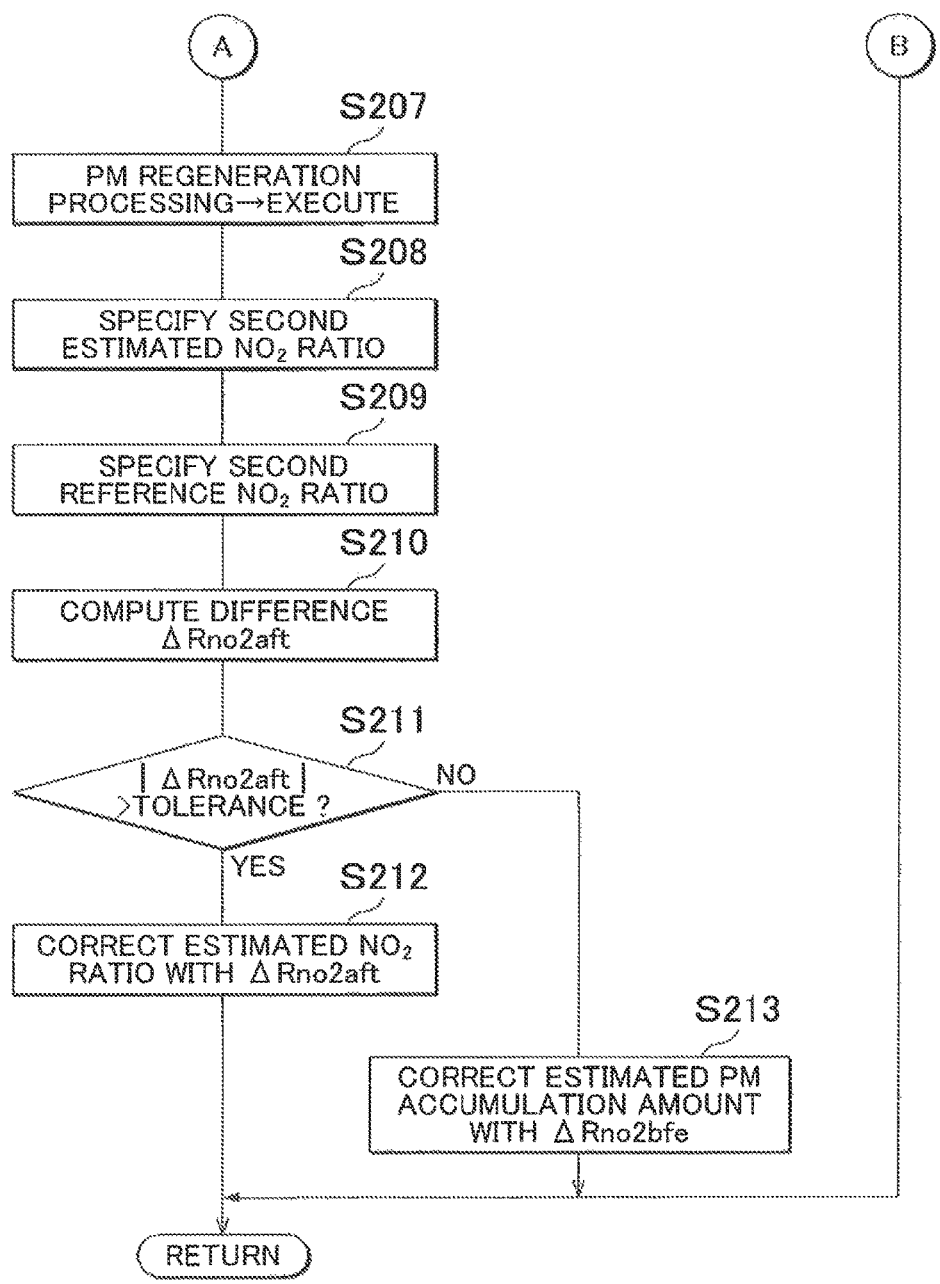

Hereafter, a procedure for calibrating the estimated $NO_2$ ratio and the estimated PM accumulation amount will be described with reference to FIG. 5A and FIG. 5B. FIG. 5A and FIG. 5B are a flowchart illustrating a processing routine that is executed by the ECU 9 when the estimated $NO_2$ ratio and the estimated PM accumulation amount are calibrated. This processing routine is executed by the ECU 9 (CPU) when the internal combustion engine 1 is in the idle operation state.

In the processing routine in FIG. 5A and FIG. 5B, the ECU 9 determines in the processing of S201 whether or not the internal combustion engine 1 is in the idle operation state. The ECU 9 temporarily terminates the execution of this routine in the case of a negative determination in the processing of S201. The ECU 9 allows the processing to proceed to S202 in the case of a positive determination in the processing of S201.

In the processing of S202, the ECU 9 computes the estimated PM accumulation amount. The estimated PM accumulation amount is computed by a method similar to that according to the first embodiment described above.

In the processing of S203, the ECU 9 computes the estimated $NO_2$ ratio (first estimated $NO_2$ ratio) that is available when the actual $NO_x$ purification rate Enox shows a peak. Specifically, the ECU 9 changes the $NO_2$ ratio of the exhaust gas that is discharged from the internal combustion engine 1 every few cycles and obtains a correlation between the estimated $NO_2$ ratio and the actual $NO_x$ purification rate Enox. Herein, the actual $NO_x$ purification rate Enox varies depending on the PM accumulation amount in the exhaust gas control apparatus. However, since the amount of the PM that is discharged per unit time from the internal combustion engine 1 is small when the internal combustion engine 1 is in the idle operation state, the PM accumulation amount for the period when the correlation between the estimated $NO_2$ ratio and the actual $NO_x$ purification rate Enox is obtained can be considered to be substantially constant. The ECU 9 specifies the estimated $NO_2$ ratio (first estimated $NO_2$ ratio) that is available when the actual $NO_x$ purification rate Enox shows a peak based on the correlation between the estimated $NO_2$ ratio and the actual $NO_x$ purification rate Enox.

In the processing of S204, the ECU 9 specifies the $NO_2$ ratio (first reference $NO_2$ ratio) that is available when the reference $NO_x$ purification rate shows a peak based on the PM accumulation amount which is available when the first estimated $NO_2$ ratio is obtained and the map which is illustrated in FIG. 2 described above. Herein, the estimated PM accumulation amount that is obtained in the processing of S202 described above is used as the PM accumulation amount which is available when the first estimated $NO_2$ ratio is obtained.

In the processing of S205, the ECU 9 computes the difference ΔRno2bfr between the first estimated $NO_2$ ratio and the first reference $NO_2$ ratio specified in the processing of S203 and S204.

In the processing of S206, the ECU 9 determines whether or not the absolute value of the difference ΔRno2bfr obtained in the processing of S205 exceeds a tolerance. In the case of a negative determination in the processing of S206, the ECU 9 terminates the execution of this routine since the errors included in the estimated $NO_2$ ratio and the estimated PM accumulation amount are within an allowable range. In the case of a positive determination in the processing of S206, the ECU 9 calibrates the estimated $NO_2$ ratio or the estimated PM accumulation amount in the processing that follows S207 since the error included in the estimated $NO_2$ ratio or the estimated PM accumulation amount exceeds the allowable range.

In the processing of S207, the ECU 9 executes the PM regeneration processing. Specifically, the ECU 9 executes the processing for increasing the ambient temperature in the second catalyst casing 4 to the temperature region allowing the oxidization of the PM as described above.

The control means according to the invention is realized by the ECU 9 executing the processing of S202 to S207.

In the processing of S208, the ECU 9 re-obtains a correlation between the actual $NO_x$ purification rate Enox and the estimated $NO_2$ ratio when the PM regeneration processing is terminated (when the PM accumulation amount is substantially zero) and specifies the estimated $NO_2$ ratio (second estimated $NO_2$ ratio) that is available when the actual $NO_x$ purification rate Enox shows a peak based on the correlation.

In the processing of S209, the ECU 9 specifies the $NO_2$ ratio (second reference $NO_2$ ratio) that is available when the reference $NO_x$ purification rate shows a peak based on the PM accumulation amount which is available when the second estimated $NO_2$ ratio is obtained and the map which is illustrated in FIG. 2 described above. Herein, the PM accumulation amount that is available when the second estimated $NO_2$ ratio is obtained is substantially zero. Accordingly, the ECU 9 may obtain the $NO_2$ ratio that is available when the reference $NO_x$ purification rate shows a peak in a case where the PM accumulation amount is zero. In a case where the PM accumulation amount is zero, the $NO_x$ purification rate reaches a peak when the $NO_2$ ratio reaches 50%. Accordingly, the ECU 9 may use 50% as the second reference $NO_2$ ratio.

In the processing of S210, the ECU 9 computes the difference ΔRno2aft between the second estimated $NO_2$ ratio and the second reference $NO_2$ ratio. Then, the ECU 9 allows the processing to proceed to S211 and determines whether or not the absolute value of the difference ΔRno2aft exceeds a tolerance.

Herein, the PM accumulation amount is substantially zero when the PM regeneration processing is terminated. Accordingly, the second reference $NO_2$ ratio that is obtained with the PM accumulation amount considered to be zero has a value substantially equal to the true value. Accordingly, in the case of a positive determination in the processing of S211, the difference ΔRno2aft can be considered to be attributed to the estimation error in the estimated $NO_2$ ratio. Then, the ECU 9 allows the processing to proceed to S212 and calibrates the estimated $NO_2$ ratio by using the difference ΔRno2aft between the second estimated $NO_2$ ratio and the second reference $NO_2$ ratio. Specifically, the ECU 9 adds the difference ΔRno2aft between the second estimated $NO_2$ ratio and the second reference $NO_2$ ratio to the estimated $NO_2$ ratio.

In the case of a negative determination in the processing of S211, the estimation error in the estimated $NO_2$ ratio can be considered to be within an allowable range. Accordingly, the difference ΔRno2bfr between the first estimated $NO_2$ ratio and the first reference $NO_2$ ratio can be considered to be attributed to the estimation error in the estimated PM accumulation amount. Then, the ECU 9 allows the processing to proceed to S213 and calibrates the estimated PM accumulation amount by using the difference ΔRno2bfr between the first estimated $NO_2$ ratio and the first reference $NO_2$ ratio. Specifically, the ECU 9 adds the difference ΔRno2bfr between the first estimated $NO_2$ ratio and the first reference $NO_2$ ratio to the estimated PM accumulation amount.

The correction means according to the invention is realized by the ECU 9 executing the processing of S208 to S213.

The reference $NO_x$ purification rate Enoxe approximates the true value when the reference $NO_x$ purification rate Enoxe is computed by using the estimated $NO_2$ ratio or the estimated PM accumulation amount calibrated in the procedure described above. As a result, the failure diagnosis processing for the selective reduction function can be more accurately executed.

The difference ΔRno2bfr is correlated to the estimation error in the estimated $NO_2$ ratio in a case where the peak value of the reference $NO_x$ purification rate Enoxe and the peak value of the actual $NO_x$ purification rate Enox are substantially equal to each other as illustrated in FIG. 4 described above and the difference ΔRno2bfr between the first estimated $NO_2$ ratio and the first reference $NO_2$ ratio exceeds a tolerance with the selective reduction function and the $NO_x$ sensors 6, 7 normal. Accordingly, the estimated $NO_2$ ratio may be calibrated based on the difference ΔRno2bfr.

Figure 6:
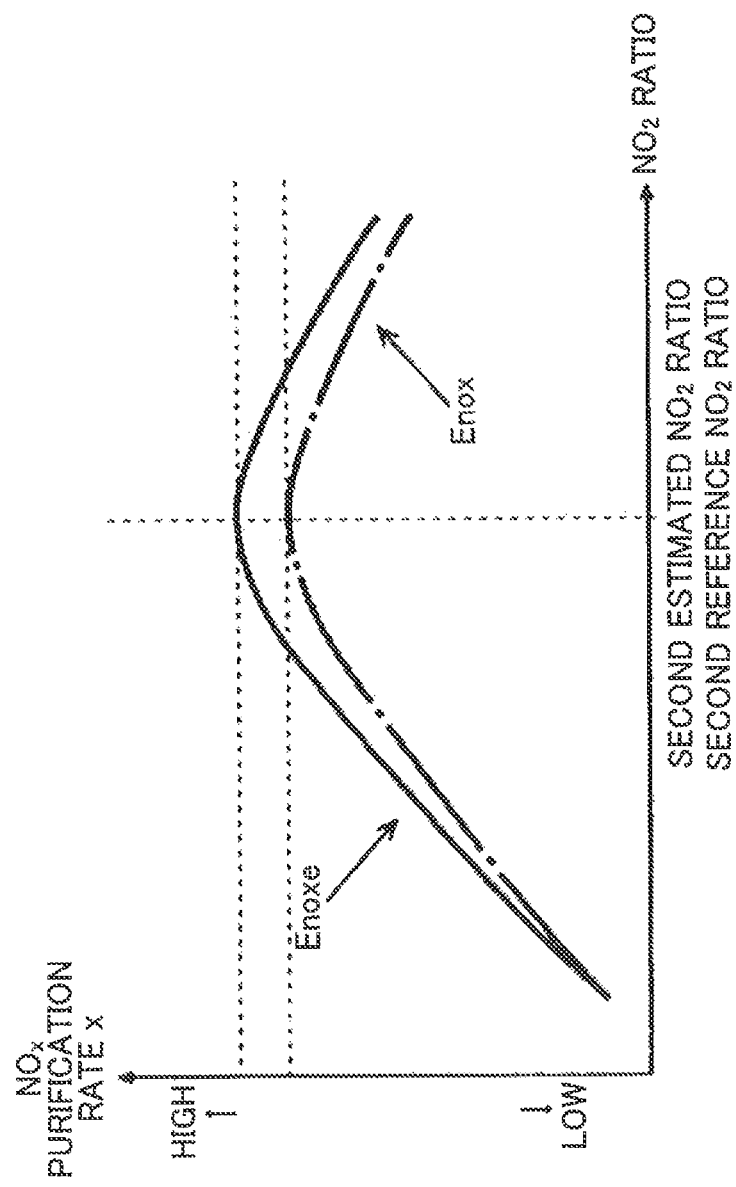
FIG. 6 is a diagram illustrating a $NO_x$ purification rate-$NO_2$ ratio relationship pertaining to the case of a normal selective reduction function with an error included in the calculated value of the PM accumulation amount.

In addition, the difference between the peak value of the actual $NO_x$ purification rate Enox and the peak value of the reference $NO_x$ purification rate Enoxe is correlated to the estimation error in the estimated PM accumulation amount when the difference ΔRno2bfr between the first estimated $NO_2$ ratio and the first reference $NO_2$ ratio is equal to or less than the tolerance as illustrated in FIG. 6 and the peak value of the actual $NO_x$ purification rate Enox and the peak value of the reference $NO_x$ purification rate Enoxe deviate from each other in a case where the selective reduction function and the $NO_x$ sensors 6, 7 are normal. Accordingly, the estimated PM accumulation amount may be calibrated based on the difference between the peak values.

Figure 7:
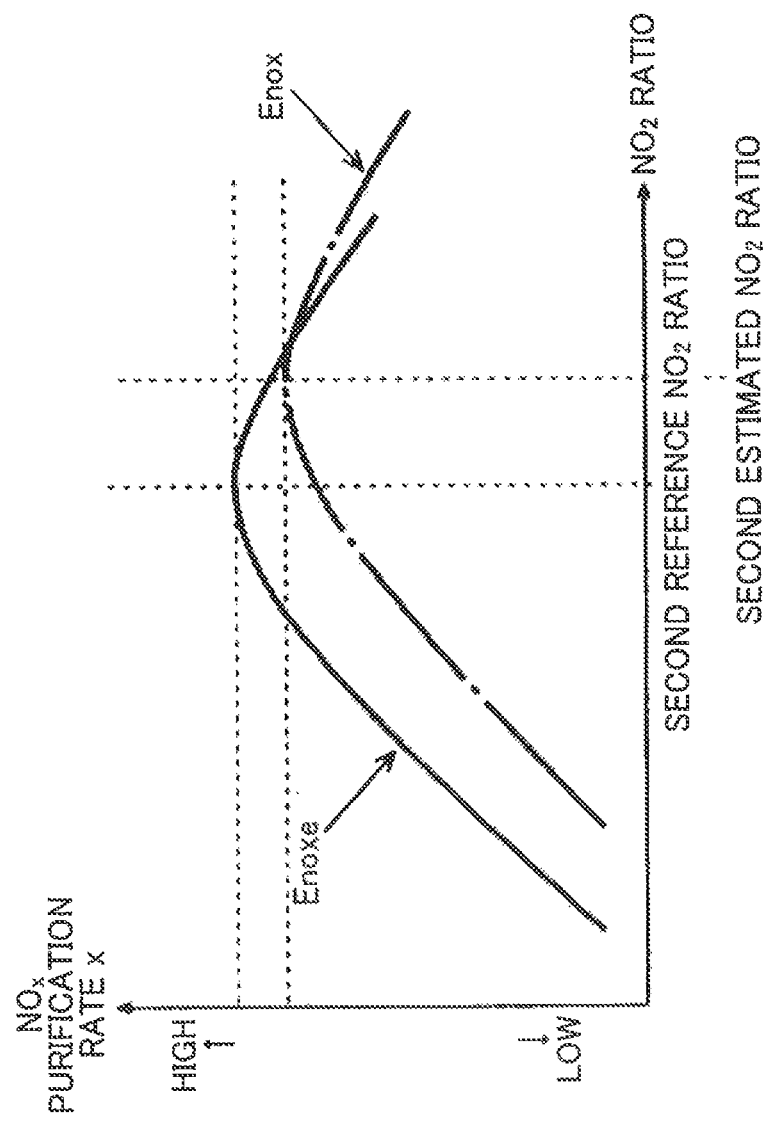
FIG. 7 is a diagram illustrating a $NO_x$ purification rate-$NO_2$ ratio relationship pertaining to the case of a normal selective reduction function with errors included in the calculated value of the $NO_2$ ratio and the calculated value of the PM accumulation amount.

Both the estimated $NO_2$ ratio and the estimated PM accumulation amount can be considered to include estimation errors when the first estimated $NO_2$ ratio and the first reference $NO_2$ ratio deviate from each other as illustrated in FIG. 7 and the peak value of the actual $NO_x$ purification rate Enox and the peak value of the reference $NO_x$ purification rate Enoxe deviate from each other in a case where the selective reduction function and the $NO_x$ sensors 6, 7 are normal. In this case, the ECU 9 calibrates the estimated PM accumulation amount first based on the difference between the peak value of the reference $NO_x$ purification rate Enoxe and the peak value of the actual $NO_x$ purification rate Enox. Then, the ECU 9 may re-obtain the difference $\Delta Rno2$ between the first estimated $NO_2$ ratio and the first reference $NO_2$ ratio by using the corrected estimated PM accumulation amount and may calibrate the estimated $NO_2$ ratio based on the difference $\Delta Rno2$. According to this method, the estimation errors in the estimated $NO_2$ ratio and the estimated PM accumulation amount can be calibrated without executing the PM regeneration processing.

REFERENCE SIGNS LIST

1 Internal combustion engine
2 Exhaust passage
3 First catalyst casing
4 Second catalyst casing
5 Reducing agent addition valve
6 First $NO_x$ sensor
7 Second $NO_x$ sensor
8 Exhaust gas temperature sensor
9 ECU
10 Crank position sensor
11 Accelerator position sensor
50 Pump
51 Reducing agent tank

The invention claimed is:

1. An engine system, comprising:
an engine;
an exhaust gas control apparatus associated with the engine and having both a selective reduction function and a filter function;
a NOx sensor arranged in an exhaust passage of the engine on a downstream side from the exhaust gas control apparatus, the NOx sensor configured to detect an amount of NOx contained in exhaust gas flowing through the exhaust passage; and
a processor configured to
a) receive operating parameters of the engine,
b) estimate a particulate matter (PM) accumulation amount in the exhaust gas control apparatus based on the received operating parameters,
c) estimate a $NO_2$ ratio as a ratio of nitrogen dioxide in NOx flowing into the exhaust gas control apparatus,
d) compute a reference NOx purification rate as a NOx purification rate based on the estimated PM accumulation amount and the estimated $NO_2$ ratio, the reference NOx purification rate corresponding to a normal exhaust gas control apparatus,
e) compute an actual NOx purification rate based on the amount of the NOx detected by the NOx sensor,
f) determine an error in the estimated $NO_2$ ratio,
g) when the error exceeds a tolerance, adjust the operating parameters of the engine to execute PM regeneration processing for oxidizing particulate matter accumulated in the exhaust gas control apparatus, correct the estimated $NO_2$ ratio, and recompute the reference NOx purification rate based on the corrected estimated $NO_2$ ratio and the adjusted operating parameters of the engine, and
h) determine that the exhaust gas control apparatus fails when a difference between the reference NOx purification rate and the actual NOx purification rate exceeds a threshold.

2. The engine system according to claim 1, wherein the processor is further configured to
a) obtain a first estimated $NO_2$ ratio and a first reference $NO_2$ ratio, the first estimated $NO_2$ ratio being an estimated $NO_2$ ratio corresponding to a maximum value of the actual NOx purification rate, and the first reference $NO_2$ ratio being a $NO_2$ ratio corresponding to a maximum value of the actual NOx purification rate for the normal exhaust gas control apparatus,
b) determine the error in the estimated $NO_2$ ratio as a difference between the first estimated $NO_2$ ratio and the first reference $NO_2$ ratio, and
c) correct the reference NOx purification rate by
i) obtaining a second estimated $NO_2$ ratio and a second reference $NO_2$ ratio after the execution of the PM regeneration processing, the second estimated $NO_2$ ratio being an estimated $NO_2$ ratio corresponding to the maximum value of the actual NOx purification rate for the normal exhaust gas control apparatus and the second reference $NO_2$ ratio being a $NO_2$ ratio corresponding to a maximum value of a $NO_x$ purification rate for the exhaust gas control apparatus having the PM accumulation amount of zero, and
ii) correcting the estimated $NO_2$ ratio when a difference between the second estimated $NO_2$ ratio and the second reference $NO_2$ ratio exceeds the tolerance.

3. The engine system according to claim 2, wherein the processor is further configured to correct the estimated PM accumulation amount by using the difference between the first estimated $NO_2$ ratio and the first reference $NO_2$ ratio in a case where the difference between the second estimated $NO_2$ ratio and the second reference $NO_2$ ratio does not exceed the tolerance.

4. The engine system according to claim 1, wherein the processor is further configured to compute the reference NOx purification rate based on a decrease in a peak value of a NOx purification rate and an increase in a $NO_2$ ratio corresponding to a maximum value of the NOx purification rate as the PM accumulation amount in the exhaust gas control apparatus increases.

* * * * *